US 11,953,508 B2

United States Patent
Funakoshi et al.

(10) Patent No.: US 11,953,508 B2
(45) Date of Patent: Apr. 9, 2024

(54) AUTOMATIC ANALYSIS DEVICE

(71) Applicant: Hitachi High-Tech Corporation, Tokyo (JP)

(72) Inventors: Sunao Funakoshi, Tokyo (JP); Takenori Okusa, Tokyo (JP); Nobuyuki Isoshima, Tokyo (JP); Koki Yokoyama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 527 days.

(21) Appl. No.: 17/285,972

(22) PCT Filed: Oct. 9, 2019

(86) PCT No.: PCT/JP2019/039745
§ 371 (c)(1),
(2) Date: Apr. 16, 2021

(87) PCT Pub. No.: WO2020/137081
PCT Pub. Date: Jul. 2, 2020

(65) Prior Publication Data
US 2021/0382078 A1    Dec. 9, 2021

(30) Foreign Application Priority Data
Dec. 27, 2018    (JP) .................................. 2018-246148

(51) Int. Cl.
*G01N 35/00* (2006.01)
*B01L 3/00* (2006.01)
*B01L 7/00* (2006.01)

(52) U.S. Cl.
CPC .......... *G01N 35/00663* (2013.01); *B01L 3/52* (2013.01); *B01L 3/56* (2013.01);
(Continued)

(58) Field of Classification Search
CPC ......... B01L 2200/025; B01L 2300/021; B01L 2300/0609; B01L 2300/08;
(Continued)

(56) References Cited

U.S. PATENT DOCUMENTS 9,835,612 B2   12/2017   Makino et al.
2003/0165407 A1*   9/2003   Aker .................... G01N 21/643
436/172
(Continued)

FOREIGN PATENT DOCUMENTS

JP    63-205567 A    8/1988
JP    2004-37161 A    2/2004
(Continued)

OTHER PUBLICATIONS

Extended European Search Report issued in European Application No. 19905745.6 dated Aug. 26, 2022 (10 pages).
(Continued)

*Primary Examiner* — Jennifer Wecker
(74) *Attorney, Agent, or Firm* — Crowell & Moring LLP

(57) ABSTRACT

An automatic analysis device includes a processing unit 3 which performs the treatment on a specimen before analysis of the specimen, supply equipment which supplies a reagent to a reaction vessel 11 disposed in the processing unit 3, a liquid temperature adjusting unit 1 which adjusts a temperature of the reagent supplied to the reaction vessel 11 by the supply equipment, a control unit 201, and a first temperature detection unit 4 which detects at least one temperature of a temperature of the air within the processing unit 3 and a temperature of the reagent supplied to the reaction vessel 11, in which the liquid temperature adjusting unit 1 and the control unit 201 execute temperature adjustment of the reagent based on a first temperature detected by the first temperature detection unit 4.

11 Claims, 11 Drawing Sheets

(52) U.S. Cl.
CPC .............. *B01L 7/00* (2013.01); *B01L 2200/16* (2013.01); *B01L 2300/0663* (2013.01); *B01L 2300/18* (2013.01); *G01N 2035/00425* (2013.01); *G01N 2035/00673* (2013.01)

(58) Field of Classification Search
CPC ........... B01L 2300/0809; B01L 3/0217; B01L 3/0275; B01L 3/0282; B01L 3/0286; B01L 3/5085; B01L 3/545; B01L 9/06; B01L 9/54; B01L 9/56; G01N 2035/1039; G01N 35/00722; G01N 35/1011; G01N 35/1065; G01N 35/1081; G01N 35/1083
See application file for complete search history.

(56) References Cited

U.S. PATENT DOCUMENTS

| | | | |
|---|---|---|---|
| 2004/0023404 A1 | 2/2004 | Shibata | |
| 2007/0104614 A1 | 5/2007 | Wang et al. | |
| 2007/0116614 A1* | 5/2007 | Onoue | G05D 23/1934 422/198 |
| 2008/0280350 A1* | 11/2008 | Moriwaki | B01L 7/52 435/286.1 |
| 2015/0232908 A1* | 8/2015 | Miyashita | C12Q 1/6806 435/39 |
| 2016/0018426 A1* | 1/2016 | Moriya | G01N 35/026 422/65 |
| 2019/0212351 A1 | 7/2019 | Konishi et al. | |
| 2020/0032780 A1* | 1/2020 | Yanagibayashi | G01N 30/32 |

FOREIGN PATENT DOCUMENTS

| | | |
|---|---|---|
| JP | 2010-66108 A | 3/2010 |
| JP | 2012-159392 A | 8/2012 |
| JP | 2013-246090 A | 12/2013 |
| WO | WO 2018/047545 A1 | 3/2018 |
| WO | WO 2018/147029 A1 | 8/2018 |

OTHER PUBLICATIONS

International Search Report (PCT/ISA/210) issued in PCT Application No. PCT/JP2019/039745 dated Dec. 24, 2019 with English translation (four (4) pages).

Japanese-language Written Opinion (PCT/ISA/237) issued in PCT Application No. PCT/JP2019/039745 dated Dec. 24, 2019 (four (4) pages).

European Office Action issued in European Application No. 19 905 745.6 dated Dec. 13, 2023 (11 pages).

* cited by examiner

[FIG. 1]
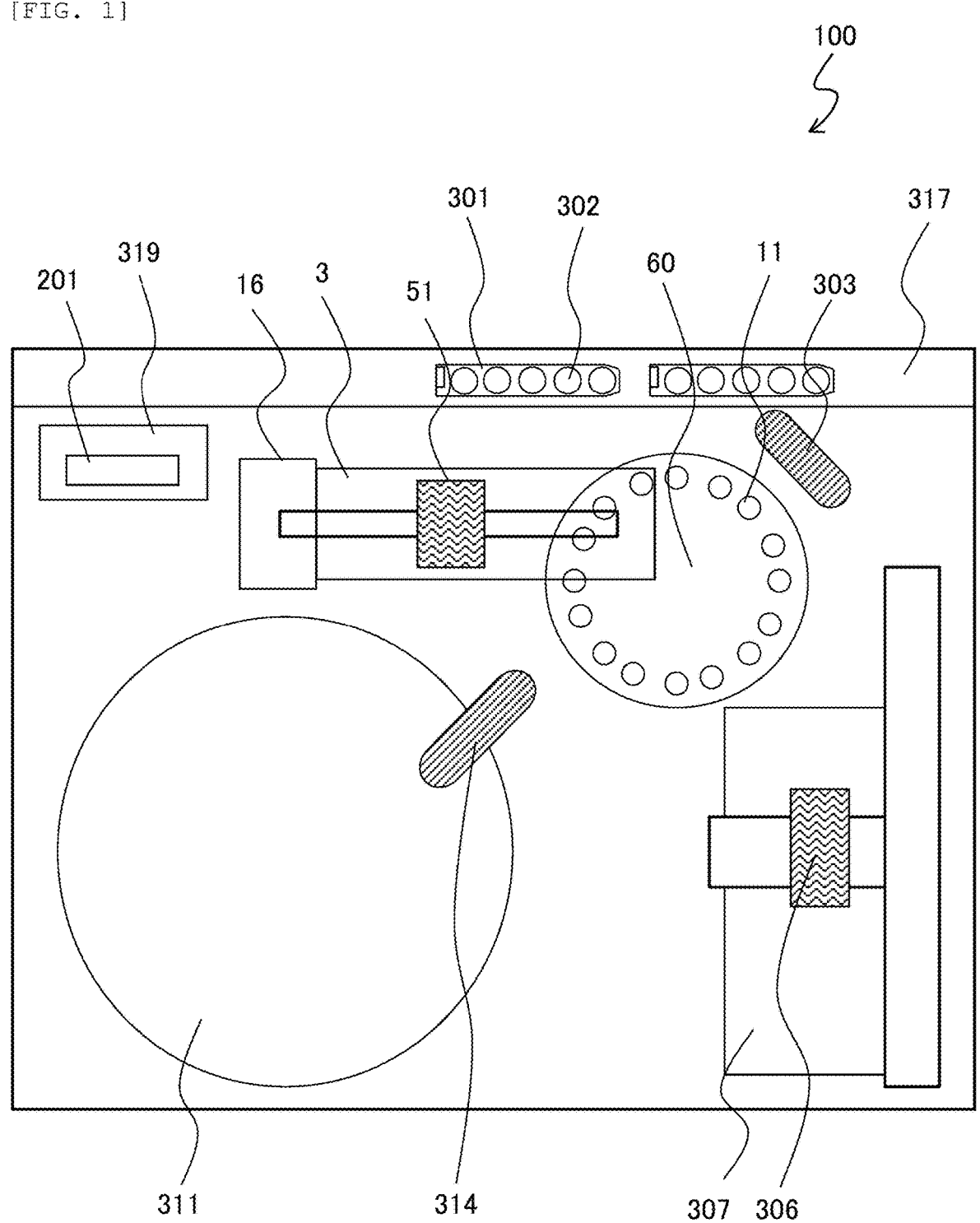

[FIG. 2]
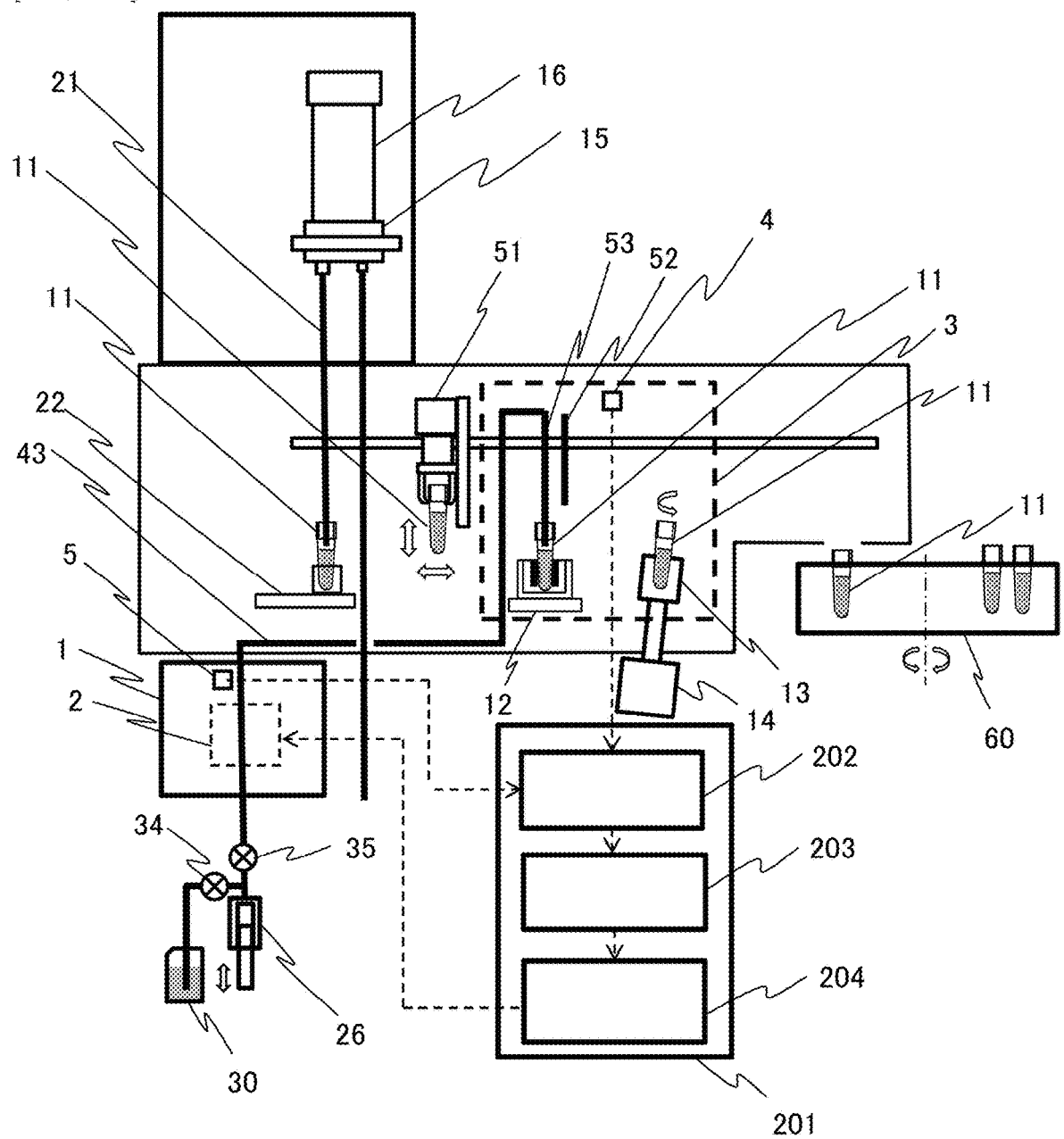

[FIG. 3]
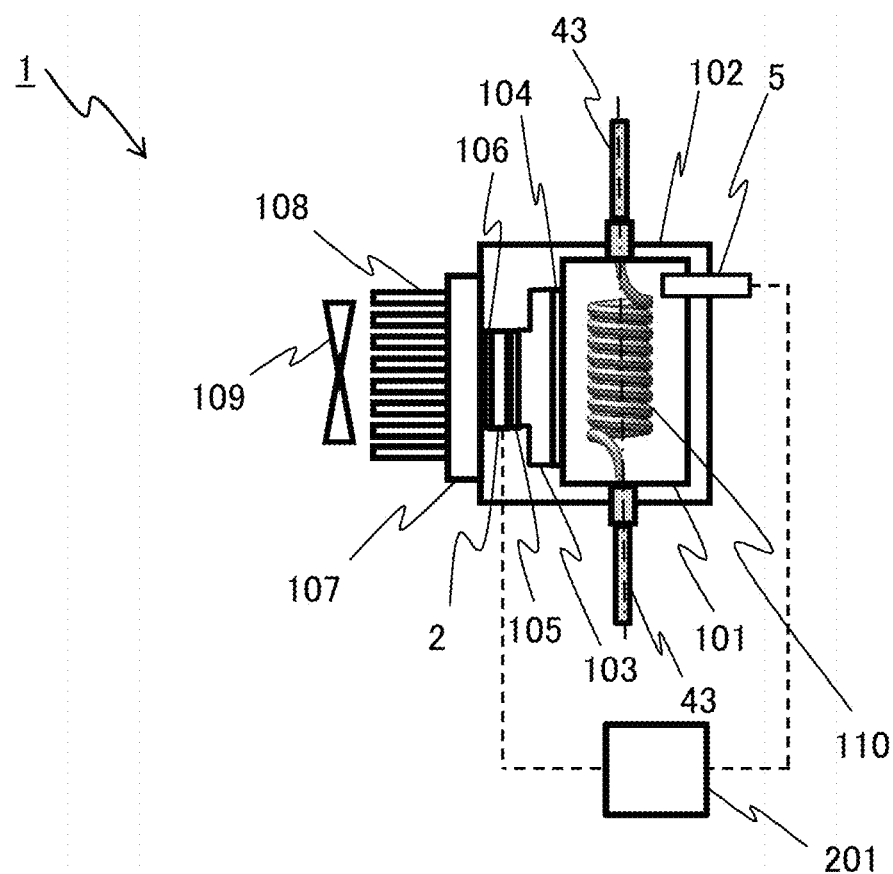
[FIG. 4]
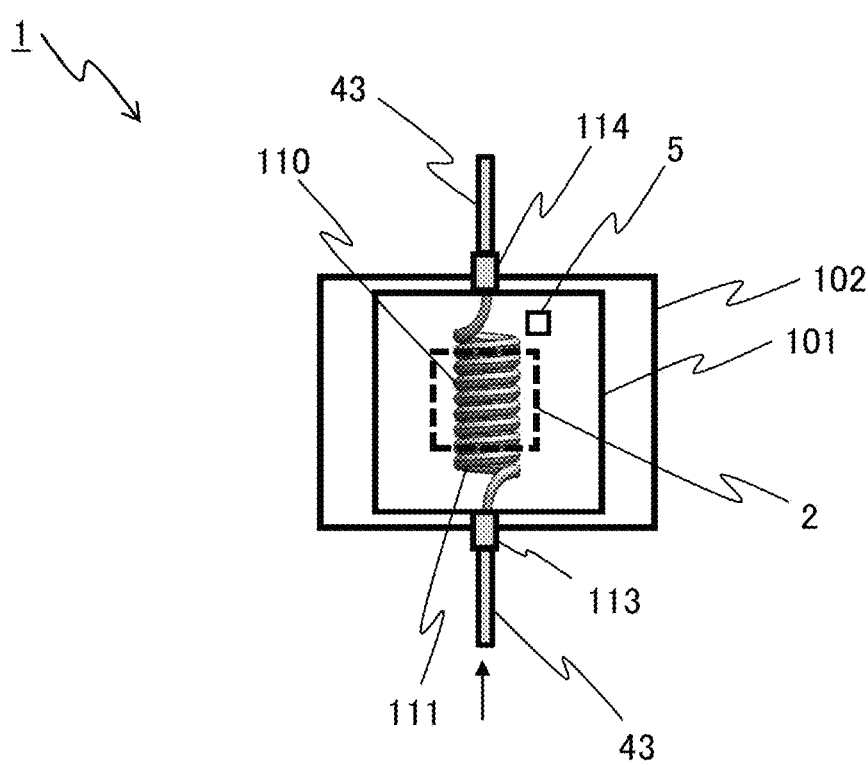

[FIG. 5]
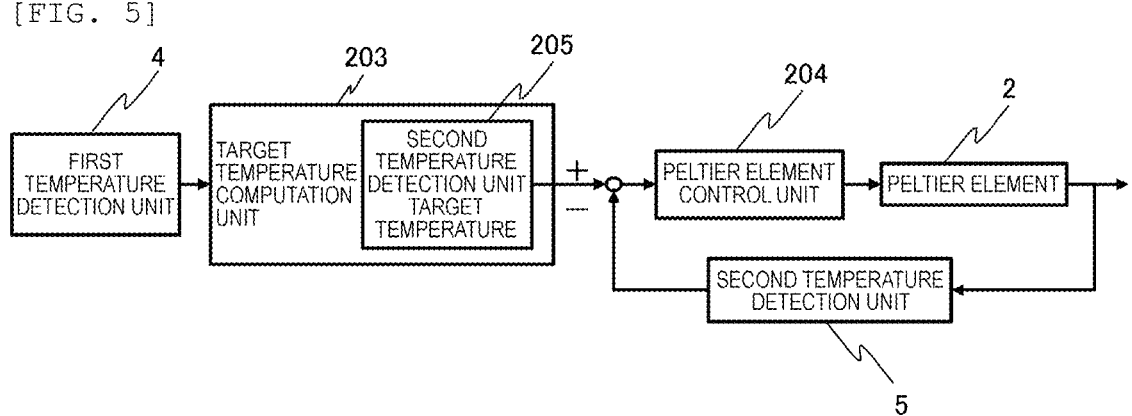
[FIG. 6]
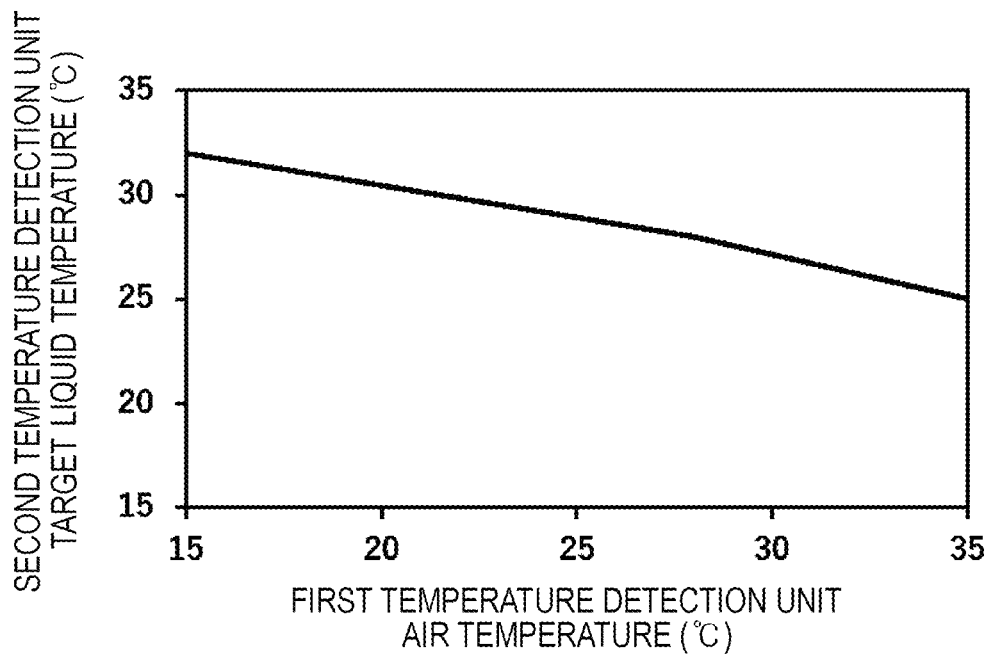

[FIG. 7]
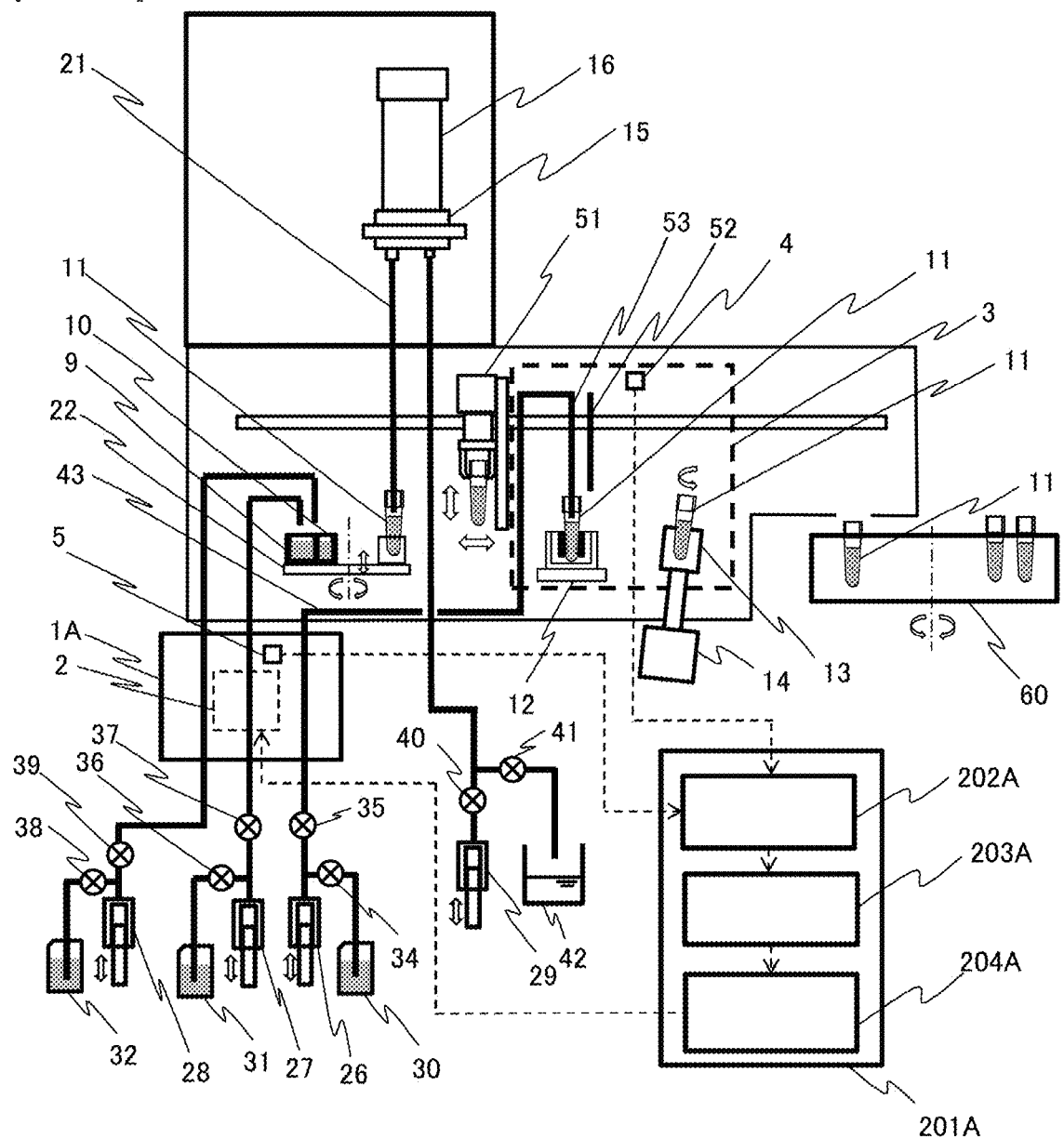

[FIG. 8]
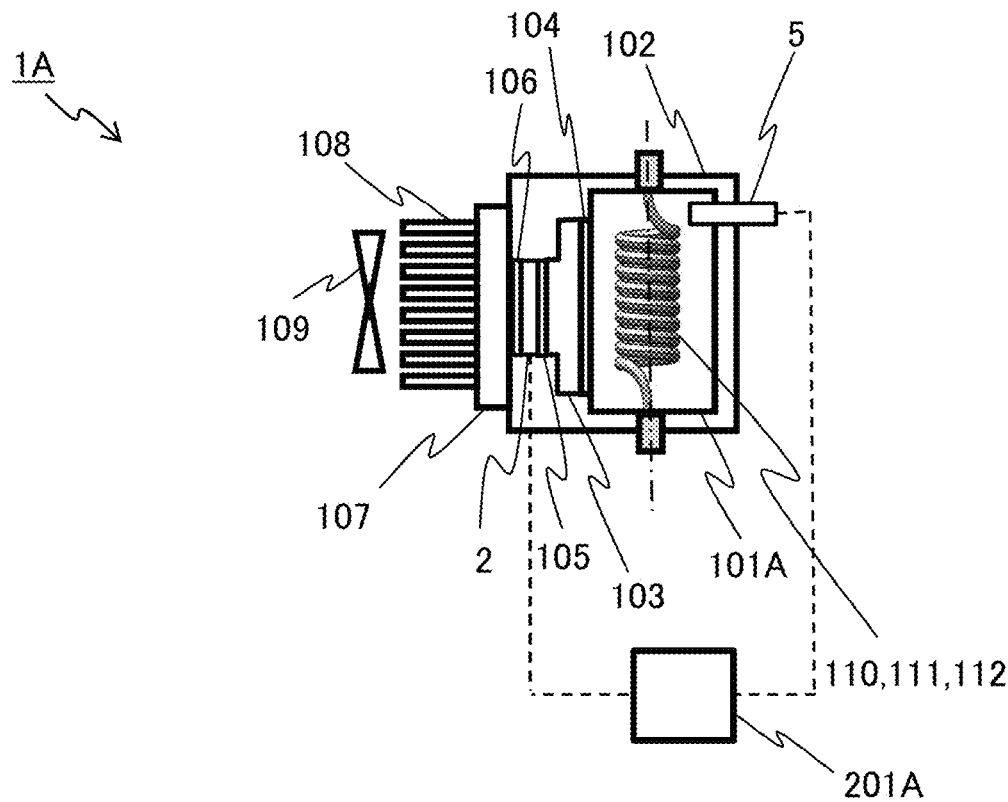
[FIG. 9]
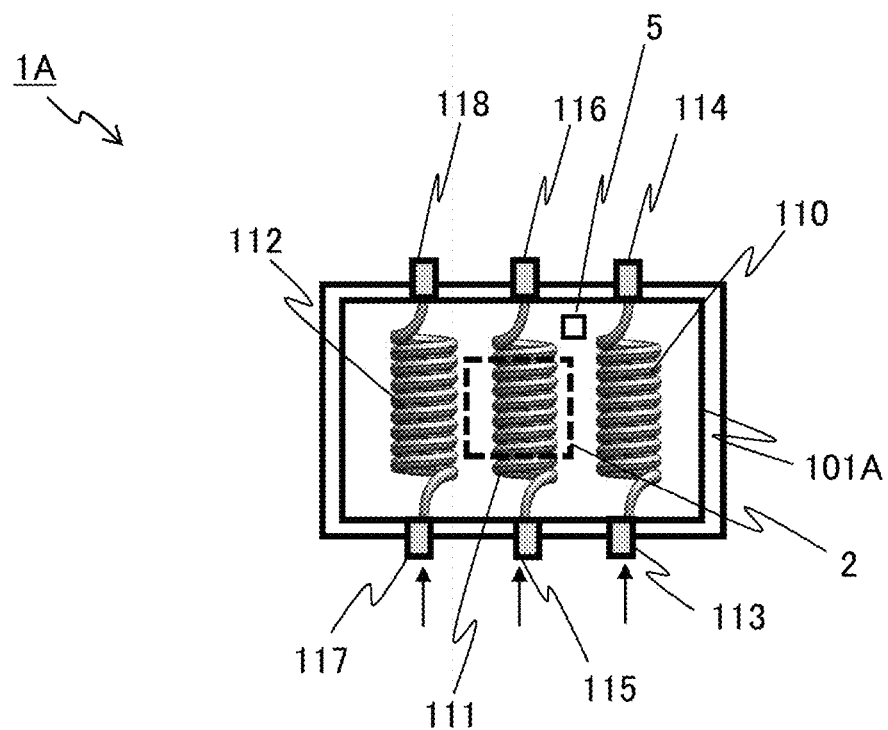

[FIG. 10]
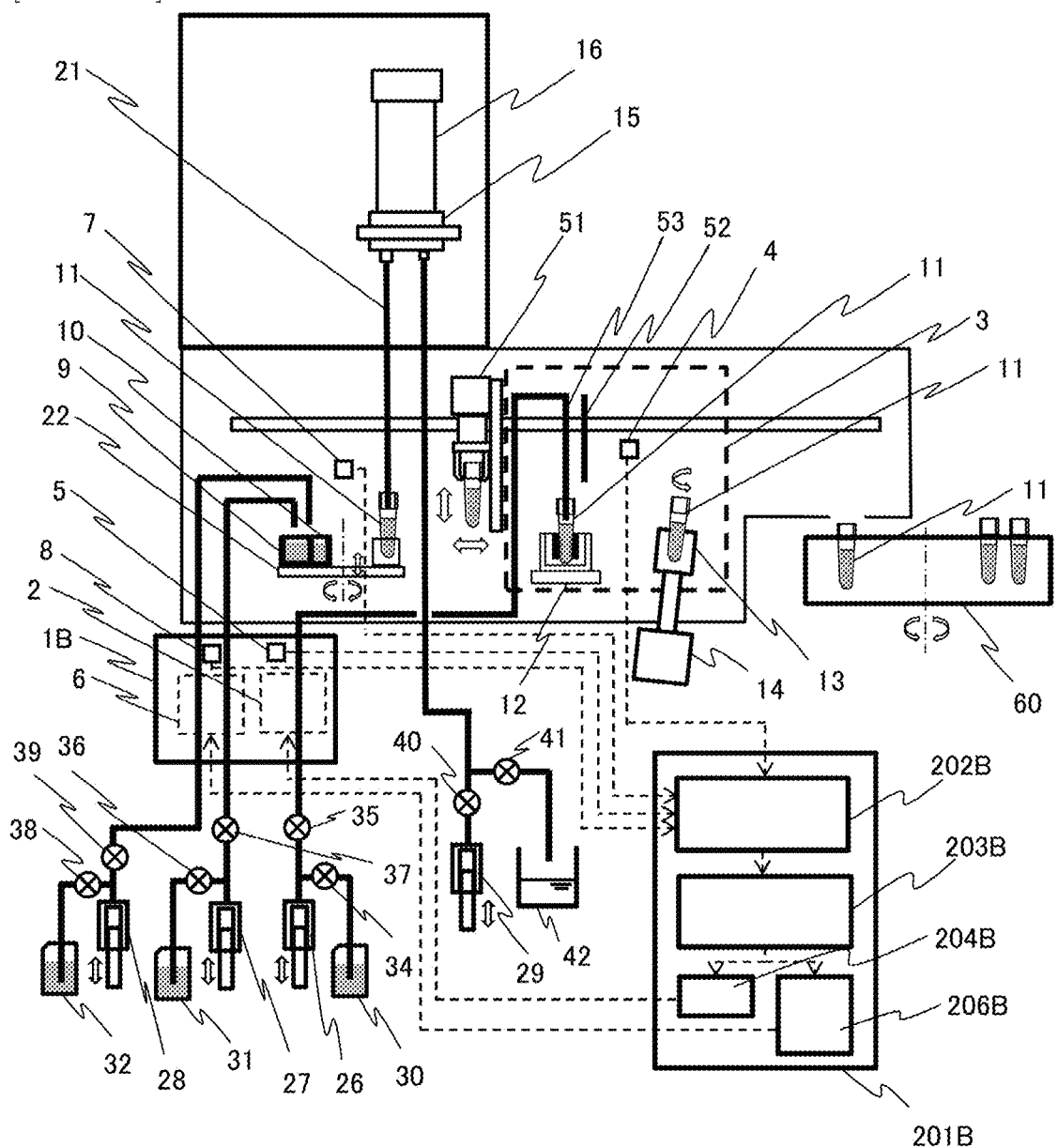

[FIG. 11]
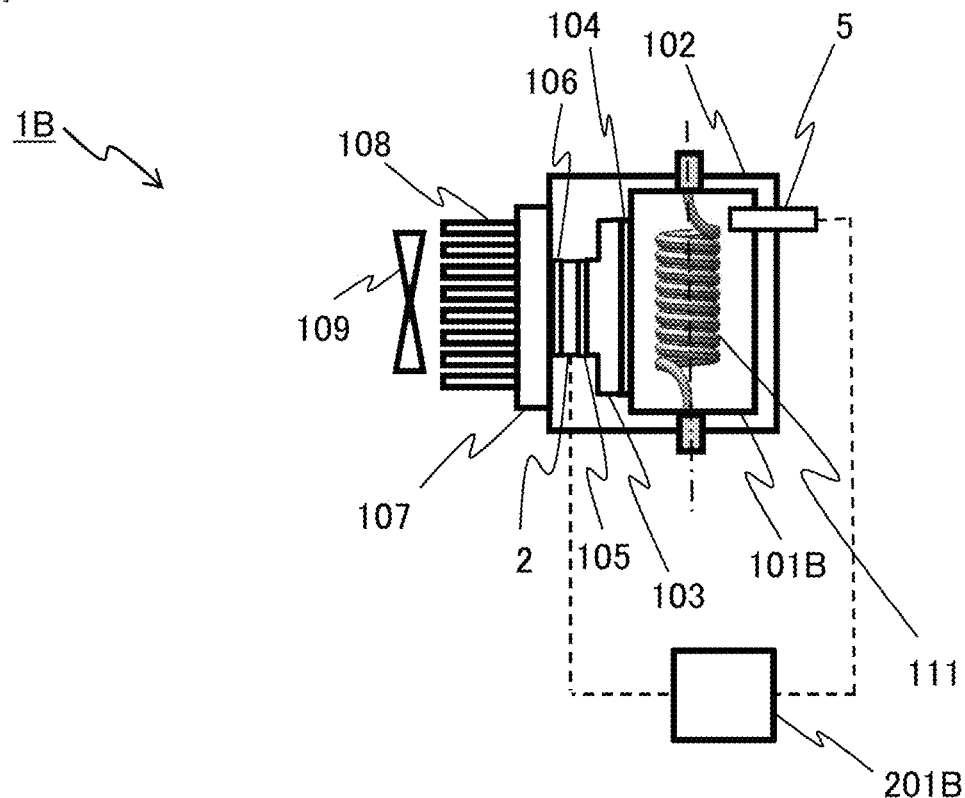
[FIG. 12]
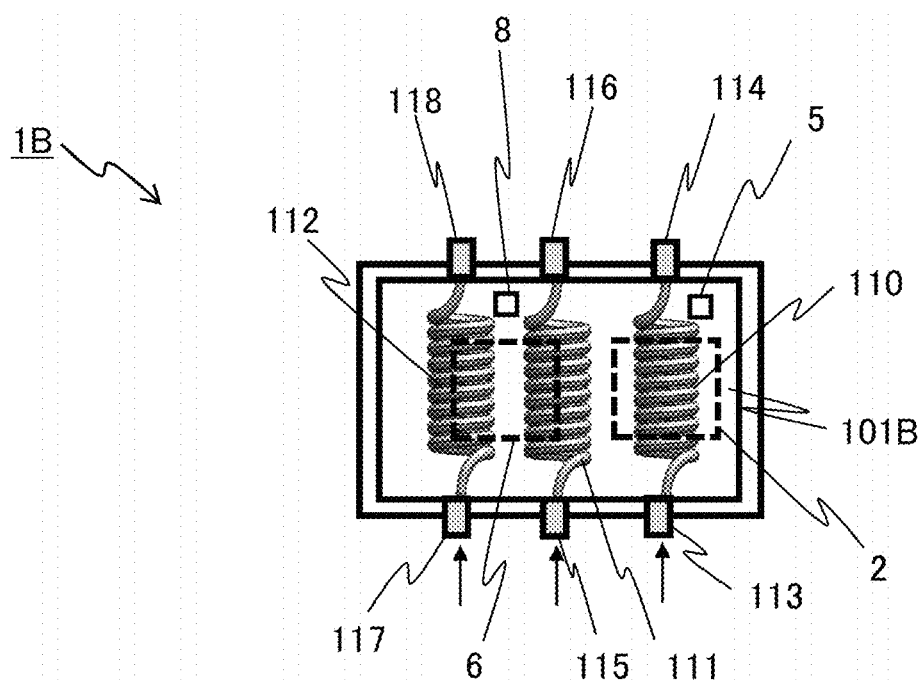

[FIG. 13]
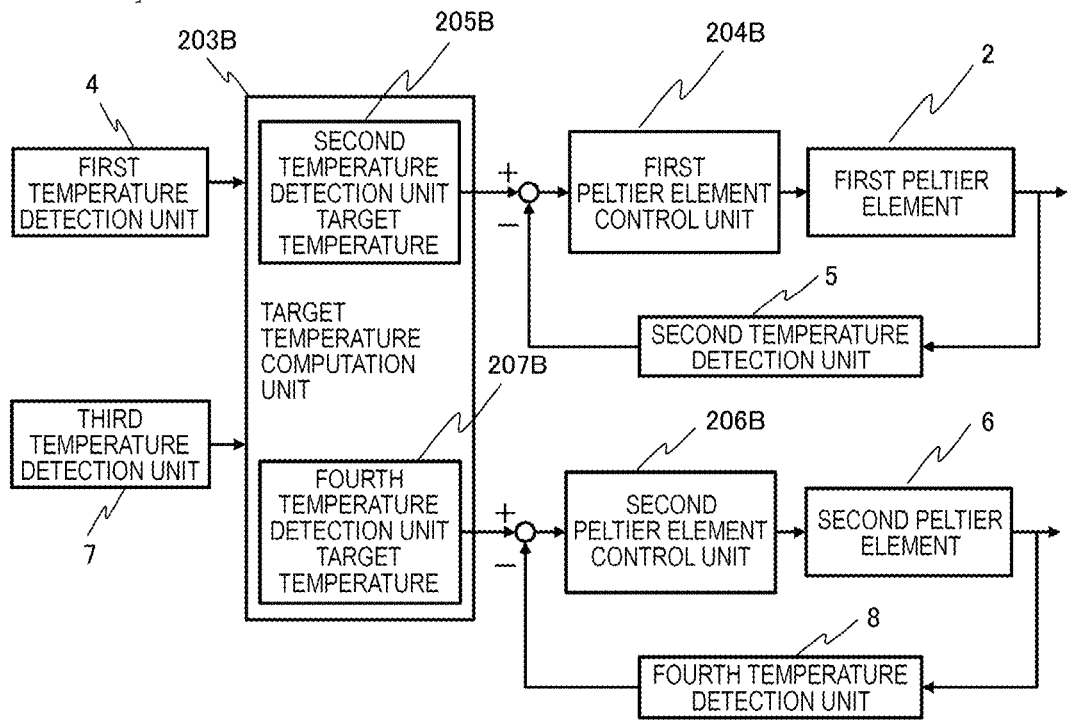
[FIG. 14]
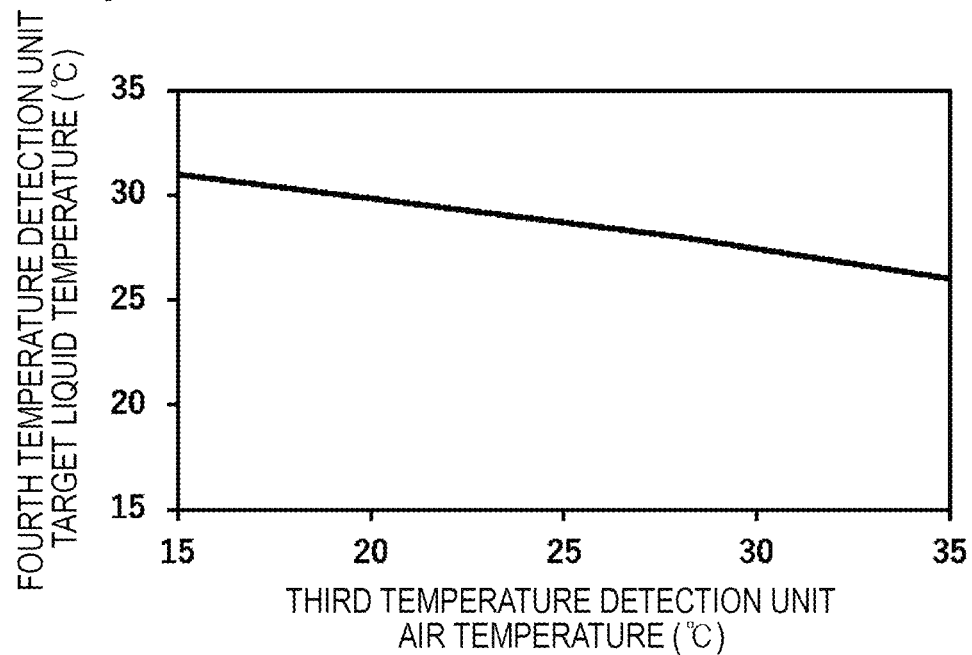

[FIG. 15]
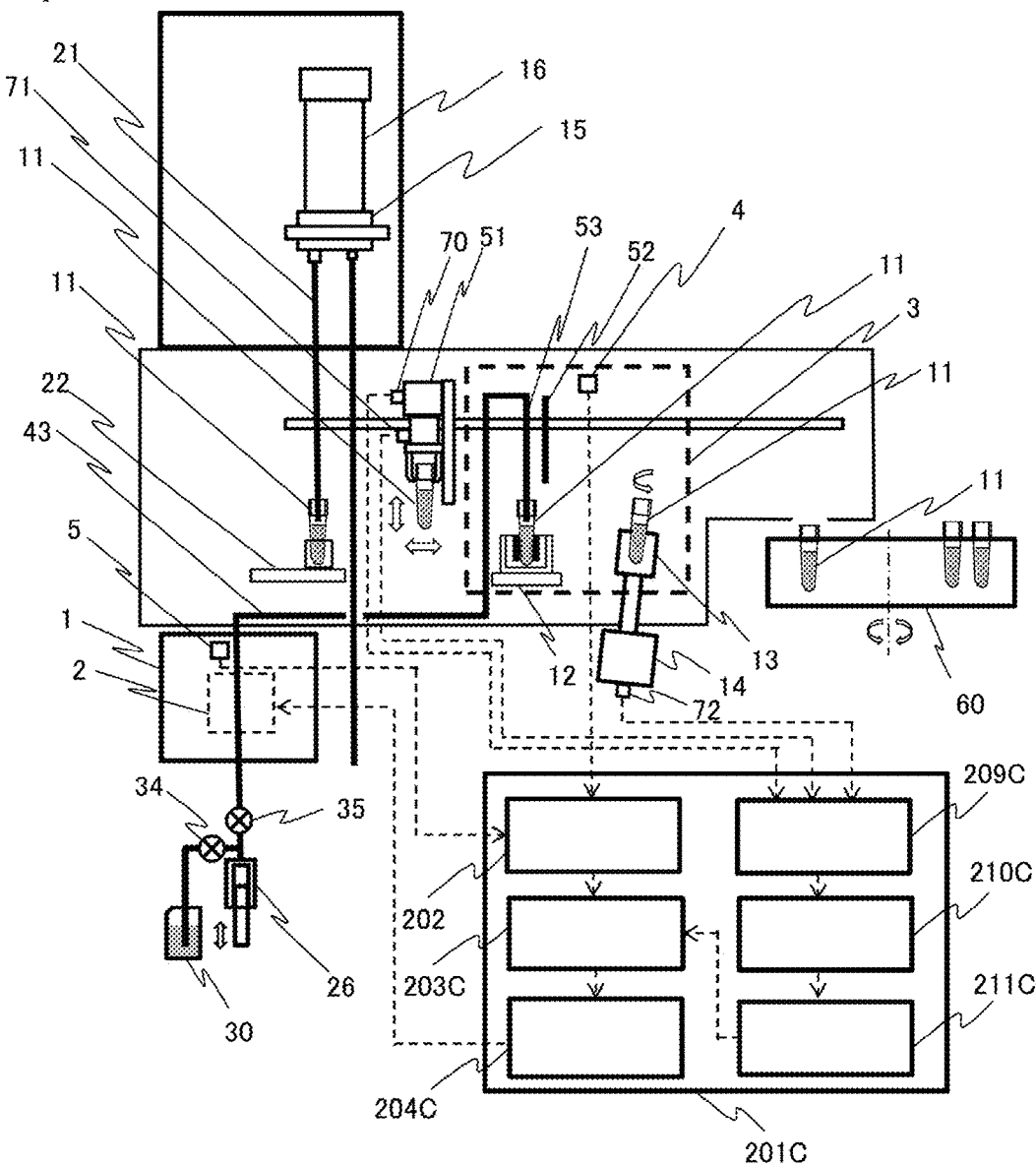

[FIG. 16]
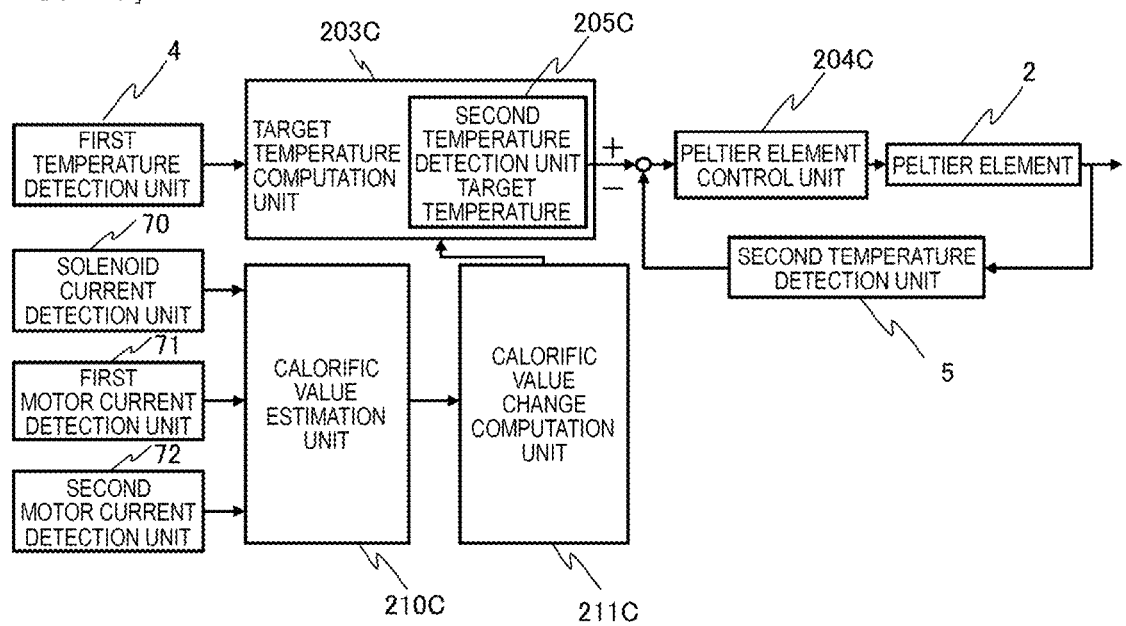
[FIG. 17]
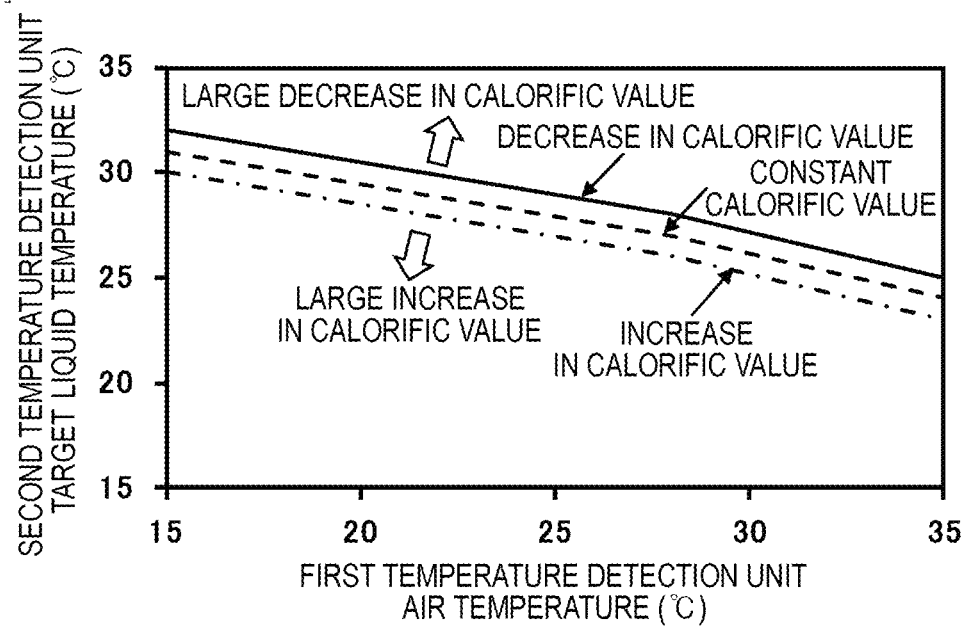

AUTOMATIC ANALYSIS DEVICE

TECHNICAL FIELD

The present invention relates to an automatic analysis device, and in particular, an automatic analysis device that adjusts the temperature of reagents used for analysis.

BACKGROUND ART

As an example of an automatic analysis device provided with a reaction vessel stirrer capable of maintaining a predetermined temperature without impairing measurement accuracy while having a simple configuration, PTL 1 describes that a rotating unit that houses and rotates a reaction vessel is supported via a bearing; the temperature of the fixed unit of the bearing is adjusted with the temperature adjusting unit to adjust the temperature of the reaction vessel via the bearing and the rotating unit; a temperature sensor is arranged in the temperature control unit, which is the fixed unit, to make it possible to detect the temperature of the temperature control unit; and it is possible to maintain the temperature at a predetermined temperature without impairing the measurement accuracy while having a simple configuration.

CITATION LIST

Patent Literature

PTL 1: JP-A-2013-246090

SUMMARY OF INVENTION

Technical Problem

An automatic analysis device is a device that performs analysis by dispensing a specimen solution containing a substance to be analyzed and a reaction reagent into a reaction vessel and reacting them, and optically measuring the reaction solution. In such an automatic analysis device, for example, specific biological components and chemical substances contained in biological samples such as blood, serum, and urine are detected.

In order to obtain sufficient analytical accuracy in an automatic analysis device, it is necessary to keep the temperature of reagents used for specimen pretreatment and analysis constant.

As a method of adjusting the temperature of the reagent, as in PTL 1, a method of connecting a bearing of a rotating unit in which a reaction vessel is installed to a temperature adjusting unit such as a Peltier element, in a reaction vessel stirring mechanism is known.

However, in the case of the method described in PTL 1, a bearing or a container is interposed between the temperature adjusting unit and the reagent. Therefore, there is room for simplifying the method for accurately controlling the temperature of the reagent and there is room for improving the accuracy of temperature control.

An object of the present invention is to provide an automatic analysis device capable of controlling a temperature of a reagent used in the device with high accuracy compared to the related art.

Solution to Problem

The present invention includes a plurality of means for solving the above-mentioned problems and an example thereof is an automatic analysis device which reacts a specimen with a reagent and measures the reacted reaction solution, the device including a processing unit which performs the treatment on a specimen before the analysis of the specimen; supply equipment which supplies the reagent to a reaction vessel disposed in the processing unit; a liquid temperature adjusting device which adjusts the temperature of the reagent supplied to the reaction vessel by the supply equipment; and a first temperature detection unit which detects at least one temperature of a temperature of the air within the processing unit and a temperature of the reagent supplied to the reaction vessel, in which the liquid temperature adjusting device executes temperature adjustment of the reagent based on a first temperature detected by the first temperature detection unit.

Advantageous Effects of Invention

According to the present invention, the temperature of the reagent used in the device can be controlled with high accuracy compared to the related art. Problems, configurations, and effects other than those mentioned above will be clarified by the description of the following examples.

BRIEF DESCRIPTION OF DRAWINGS

FIG. 1 is a diagram illustrating an overall configuration of an automatic analysis device according to Example 1 of the present invention.

FIG. 2 is an enlarged diagram of a processing unit and a liquid temperature adjusting unit of the automatic analysis device according to Example 1.

FIG. 3 is a diagram illustrating a structure of the liquid temperature adjusting unit of the automatic analysis device according to Example 1.

FIG. 4 is a diagram illustrating a structure of the liquid temperature adjusting unit of the automatic analysis device according to Example 1, when seen from a direction different from FIG. 3.

FIG. 5 is a block diagram illustrating a control method of the liquid temperature adjusting unit of the automatic analysis device according to Example 1.

FIG. 6 is a diagram illustrating an example of the relationship between an air temperature of a first temperature detection unit and a target liquid temperature of a second temperature detection unit of the automatic analysis device according to Example 1.

FIG. 7 is an enlarged diagram of a processing unit and a liquid temperature adjusting unit of an automatic analysis device according to Example 2 of the present invention.

FIG. 8 is a diagram illustrating a structure of the liquid temperature adjusting unit of the automatic analysis device according to Example 2.

FIG. 9 is a diagram illustrating a structure of the liquid temperature adjusting unit of the automatic analysis device according to Example 2, when seen from a direction different from FIG. 8.

FIG. 10 is an enlarged diagram of a processing unit and a liquid temperature adjusting unit of an automatic analysis device according to Example 3 of the present invention.

FIG. 11 is a diagram illustrating a structure of the liquid temperature adjusting unit of the automatic analysis device according to Example 3.

FIG. 12 is a diagram illustrating a structure of the liquid temperature adjusting unit of the automatic analysis device according to Example 3, when seen from a direction different from FIG. 11.

FIG. 13 is a block diagram illustrating a control method of the liquid temperature adjusting unit of the automatic analysis device according to Example 3.

FIG. 14 is a diagram illustrating an example of the relationship between an air temperature of a third temperature detection unit and a target liquid temperature of a fourth temperature detection unit of the automatic analysis device according to Example 3.

FIG. 15 is an enlarged diagram of a processing unit and a liquid temperature adjusting unit of an automatic analysis device according to Example 4 of the present invention.

FIG. 16 is a block diagram illustrating a control method of the liquid temperature adjusting unit of the automatic analysis device according to Example 4.

FIG. 17 is a diagram illustrating an example of the relationship between an air temperature of the first temperature detection unit of the automatic analysis device, an estimated value of a change in calorific value, and a target liquid temperature of the second temperature detection unit according to Example 4.

DESCRIPTION OF EMBODIMENTS

Hereinafter, examples of the automatic analysis device of the present invention will be described with reference to the accompanying drawings.

The following examples are examples when applied to an automatic immunoassay analyzer. The present invention is not limited to the automatic immunoassay analyzer and can be applied to other types of automatic analysis devices such as automatic biochemical analysis devices that require temperature adjustment of reagents. For example, it can be applied to an analysis unit that analyzes electrolyte analysis items of an automatic biochemical analysis device.

Example 1

Example 1 of the automatic analysis device of the present invention will be described with reference to FIGS. 1 to 6.

First, the overall configuration of the automatic analysis device in this example will be outlined with reference to FIGS. 1 and 2. FIG. 1 is a plan view showing the overall configuration of the automatic analysis device of Example 1. FIG. 2 is an enlarged view of a processing unit and a liquid temperature adjusting unit in the automatic analysis device shown in FIG. 2.

As shown in FIG. 1, an automatic analysis device 100 in this example is a device which reacts a specimen and a reagent and measures the reacted reaction solution and includes a specimen dispensing nozzle 303, a reaction table 60, a reaction vessel transport mechanism 306, a specimen dispensing tip and reaction vessel holding member 307, a reagent disk 311, a reagent dispensing nozzle 314, a processing unit 3, a detector 16, a rack conveyance line 317, and a control device 319.

The rack conveyance line 317 is a line for transporting a rack 301 on which a plurality of specimen containers 302 containing a specimen can be placed to a specimen dispensing position or the like.

The specimen dispensing nozzle 303 is a nozzle for sucking the specimen contained in the specimen container 302 and discharging the specimen to a reaction vessel 11.

The reaction table 60 is a disk for performing the reaction between the specimen and the reagent at a constant temperature, and the temperature is maintained at a predetermined temperature by a heater (not illustrated) to promote the reaction between the specimen and the reagent. A plurality of reaction vessels 11 are held in the reaction table 60 and serve as a place for mixing and reacting the specimen and the reagent.

The reaction vessel transport mechanism 306 transports the reaction vessel 11. The specimen dispensing tip and reaction vessel holding member 307 stores the disposable tip and the reaction vessel 11 used for specimen dispensation.

The reagent disk 311 is a disk which stores a reagent bottle and is kept cold in order to suppress deterioration of the reagent. The reagent dispensing nozzle 314 is a nozzle for sucking the reagent stored in the reagent bottle within the reagent disk 311 and discharging the reagent to the reaction vessel 11.

The processing unit 3 performs the treatment on the specimen before the analysis of the specimen by the detector 16. The detector 16 performs detection using the liquid in which the reaction has been completed within the reaction vessel 11. The details of the processing unit 3 and the detector 16 will be described later.

The control device 319 controls various operations of the above-mentioned members and also performs computation processing for obtaining the concentration of a predetermined component in the specimen from the detection result performed by the detector 16. The control device 319 is provided with a control unit 219 that executes temperature control of a liquid temperature adjusting unit 1. The details of the control unit 219 will also be described later.

Next, the overall flow of analysis in the automatic analysis device of this example illustrated in FIGS. 1 and 2 will be outlined. Prior to the analysis, the user disposes consumables such as the reagent bottles, the specimen dispensing tips, and the reaction vessels 11 necessary for the analysis on the reagent disk 311 and the specimen dispensing tip and reaction vessel holding member 307 within the analysis device.

First, the user inserts the rack 301 into the automatic analysis device in a state where the specimen such as blood or urine to be analyzed is put in the specimen container 302. Here, an unused reaction vessel 11 and specimen dispensing tip are transported to the reaction table 60 and the specimen dispensing tip mounting position by the reaction vessel transport mechanism 306 of the analysis device.

After that, the reagent dispensing nozzle 314 accesses the inside of the reagent disk 311 to dispense the reagent stored within the reagent bottle into the reaction vessel 11 on the reaction table 60.

After that, when the rack 301 passes through the rack conveyance line 317 and reaches the specimen dispensing position, the specimen is dispensed into the reaction vessel 11 by the specimen dispensing nozzle 303 and the reaction between the specimen and the reagent starts. The reaction referred to here means, for example, binding a specimen to a luminescent labeled substance by an antigen-antibody reaction using a luminescent labeled antibody that reacts only with a specific antigen of the specimen as a reagent. At this time, the stirring of the specimen and the reagent is performed by sucking and discharging the mixture of the specimen and the reagent within the specimen dispensing tip.

After this operation is completed, the used specimen dispensing tip is transported to the disposal unit by the reaction vessel transport mechanism 306 and discarded.

After the reaction between the specimen and the reagent is started by stirring, another reagent may be added at a specific timing to perform the reaction. For example, there is a process of further binding a magnetic bead with an antibody bound to the surface thereof to the antigen described above. Therefore, the reaction vessel 11 placed on the reaction table 60 for a predetermined time by a transport mechanism 51 is transported to a magnetic separating unit 12 in the processing unit 3 which performs pretreatment of the analysis.

As shown in FIG. 2, in the magnetic separating unit 12, the specimen is magnetically separated, then an unnecessary solution is discharged from a suction nozzle 52, and a reagent called a replacement solution is discharged from a discharge nozzle 53. The replacement solution is stored in a reagent storing unit 30 and is supplied by opening a solenoid valve 34 and closing a solenoid valve 35 to suck the reagent into a syringe pump which intermittently feeds the reagent, and then closing the solenoid valve 34 and opening the solenoid valve 35 to discharge the reagent from the syringe pump 26. The temperature of the replacement solution is adjusted in advance in the liquid temperature adjusting unit 1 by a method described later.

The suction nozzle 52, the discharge nozzle 53, the reagent storing unit 30, the solenoid valves 34 and 35, and the syringe pump 26 correspond to supply equipment which supplies reagents to the reaction vessel 11 disposed in the processing unit 3.

After the magnetic separation process is completed, the reaction vessel 11 is transported to a stirrer 13 in the processing unit 3 by the transport mechanism 51. In the stirrer 13, the stirring is performed by rotating the reaction vessel 11 by a motor 14.

After the stirring for a predetermined time is completed, the reaction vessel 11 is transported to the reaction table 60 again by the transport mechanism 51.

Regardless of the presence or absence of magnetic separation, the reaction vessel 11 that has passed a predetermined time while being placed on the reaction table 60 is transported to a container holding unit 22 by the transport mechanism 51, and the reaction solution is guided from the suction nozzle 21 to a detection container 15. In the detection container 15, the detector 16 detects the signal from the reaction solution, and the analysis result is notified to the user and recorded in the storage device.

After the detection operation is completed, the reaction vessel 11 is transported to the disposal unit by the transport mechanism 51 and the reaction vessel transport mechanism 306 and discarded.

Next, the configuration of the liquid temperature adjusting unit 1 which executes the control of the temperature of the replacement solution of this example and the surroundings thereof, and the operation thereof will be described with reference to FIGS. 2 to 6.

It is desirable that the temperature adjustment of the replacement solution by the liquid temperature adjusting unit 1 shown below is preferably started at the time of warming up of the automatic analysis device 100 and stably executed at the time of standby. However, the timing is not particularly limited and it is desirable that the temperature adjustment is stably performed during the analysis.

In this example, a first temperature detection unit 4 which detects the temperature of the air within the processing unit 3 is provided in the vicinity of the magnetic separating unit 12 and the stirrer 13 in the processing unit 3.

Further, the liquid temperature adjusting unit 1 which adjusts the temperature of the replacement solution is provided with a second temperature detection unit 5 which measures the liquid temperature at the outlet of a spiral pipe 110 (see FIG. 3 and the like) in order to detect the temperature of the reagent supplied to the processing unit 3.

The first temperature detection unit 4 and the second temperature detection unit 5 are composed of a thermistor, a thermocouple, or the like, and the detection signal is taken into a sensor input processing unit 202 of a control unit 201.

The signals from the first temperature detection unit 4 and the second temperature detection unit 5 are taken into the sensor input processing unit 202 of the control unit 201, a target temperature computation unit 203 calculates a target liquid temperature of the second temperature detection unit 5, and a Peltier element control unit 204 controls the energization of the Peltier element.

The control unit 201 obtains a target value of the second temperature to be detected by the second temperature detection unit 5 based on a first temperature detected by the first temperature detection unit 4 and outputs a control signal which executes temperature adjustment based on a difference between the measured second temperature and the target value with respect to the liquid temperature adjusting unit 1. The liquid temperature adjusting unit 1 executes the temperature adjustment of the replacement solution based on the control signal.

In particular, the control unit 201 executes temperature adjustment such that as the first temperature is higher, the second temperature is lower, and the first temperature is lower, the second temperature is higher.

As shown in FIGS. 3 and 4, the liquid temperature adjusting unit 1 includes a metal block 101, the spiral pipe 110, connectors 113 and 114, thermal interfaces 104, 105, and 106, a heat diffusion plate 103, a first Peltier element 2, a fin base 107, fins 108, and a heat insulating material 102.

The metal block 101 is a metal block made of a metal having high thermal conductivity such as aluminum, and the spiral pipe 110 obtained by spirally forming a pipe such as stainless steel is attached. As a method of attaching the spiral pipe 110, there is a method of making a through hole in the metal block 101 open, inserting the spiral pipe 110, pouring solder or the like into the periphery, and fixing the spiral pipe 110. The connectors 113 and 114 are attached to the inlet and outlet of the spiral pipe 110. The connectors 113 and 114 are threaded and are connected to a tube 43 for supplying the replacement solution from the reagent storing unit 30 to the discharge nozzle 53 by a tube joint. It is not necessary to use the spiral pipe 110, and a pipe having another shape such as a straight line may be used.

The heat diffusion plate 103 made of aluminum or the like is connected to the metal block 101 described above via the thermal interface 104 such as grease. Further, the first Peltier element 2 is connected to the surface of the metal block 101 different from the surface connected to the heat diffusion plate 103 via the thermal interface 105. Further, a heat sink composed of the fin base 107 and the fin 108 is connected to the opposite surface of the first Peltier element 2 via the thermal interface 106.

The first Peltier element 2, the thermal interfaces 104, 105, and 106, and the heat diffusion plate 103 are fixed by a method of sandwiching them between the metal block 101 and the fin base 107 and fixing them with screws. The periphery of the metal block 101 is insulated by the heat insulating material 102.

Next, the operation of the liquid temperature adjusting unit 1 will be described. Here, the thermal interfaces 104, 105, and 106 are all described as thermal grease.

In this example, in the cooling operation in which the temperature of the air within the processing unit 3 detected by the first temperature detection unit 4 needs to be high and the reagent needs to be cooled, of the two main surfaces of the first Peltier element 2, the first Peltier element 2 is energized such that temperature of the surface on the metal block 101 side is low and the temperature of the surface on the fin base 107 side is high.

As a result, the heat of the reagent moving in the spiral pipe 110 or the heat of the reagent staying therein is absorbed by the first Peltier element 2 through the metal block 101, a grease 104, the heat diffusion plate 103, and a grease 105. Further, the surface of the first Peltier element 2 on the opposite side generates heat (radiate heat), and the heat is transferred from a grease 106 and the fin base 107 to the fins 108, and is radiated to the air flowing between the fin 108 by a fan 109.

On the other hand, in the heating operation in which the temperature of the air within the processing unit 3 needs to be low and the reagent needs to be heated, the element is energized such that the surface of the first Peltier element 2 on the metal block 101 side is high and the temperature of the fin base 107 side is low.

As a result, the temperature of the fins 108 is lower than the air temperature, and the heat is taken from the air flowing between the fins by the fan 109 and absorbed by the first Peltier element 2 via the fin base 107 and the grease 106. Further, the surface of the first Peltier element 2 on the opposite side generates heat (radiate heat), and the heat is applied to the reagent moving in the spiral pipe 110 or the reagent staying therein through the grease 105, the heat diffusion plate 103, the grease 104, and the metal block 101.

FIG. 5 shows a block diagram of the Peltier element control.

In the control unit 201, the target temperature computation unit 203 calculates a target temperature 205 to be detected by the second temperature detection unit from the air temperature in the vicinity of the processing unit 3 detected by the first temperature detection unit 4. The Peltier element control unit 204 obtains a current value to be output to the first Peltier element 2 based on a difference between the target temperature of the second temperature detection unit 5 calculated by the target temperature computation unit 203 and the temperature of the reagent actually detected by the second temperature detection unit 5 and outputs a command signal such that the obtained current value flows to the first Peltier element 2.

As a method of controlling the current output, for example, based on the temperature detected at regular time intervals and the target temperature, the current on and off time ratio, that is, the duty is controlled based on the proportional-integro-differential control (PID control) at regular time intervals, thereby controlling the cooling or heating capacity of the first Peltier element 2. At this time, the current when energized is constant.

As another control method, the cooling and heating capacities of the Peltier element may be controlled by changing the current flowing through the first Peltier element 2. In this case, the first Peltier element 2 is continuously energized.

FIG. 6 shows an example of the relationship between the air temperature detected by the first temperature detection unit 4 and the target liquid temperature of the second temperature detection unit 5. As the air temperature in the vicinity of the processing unit 3 detected by the first temperature detection unit 4 is higher, the target temperature of the second temperature detection unit 5, that is, the liquid temperature of the reagent (replacement solution) is set to be lower.

Without being limited to the relationship as shown in FIG. 6, depending on the characteristics and purpose of the reagent, as the air temperature in the vicinity of the processing unit 3 detected by the first temperature detection unit 4 is higher, the target temperature of the second temperature detection unit 5, that is, the liquid temperature of the reagent (replacement solution) may be set to be high.

Next, the effect of this embodiment will be described.

The automatic analysis device 100 of Example 1 of the present invention described above includes the processing unit 3 which performs the treatment on a specimen before the analysis of the specimen, the supply equipment which supplies a reagent to the reaction vessel disposed in the processing unit 3, the liquid temperature adjusting unit 1 which adjusts the temperature of the reagent supplied to the reaction vessel 11 by the supply equipment, the control unit 201, and the first temperature detection unit 4 which detects at least one temperature of the temperature of the air within the processing unit 3 and the temperature of the reagent supplied to the reaction vessel 11, in which the liquid temperature adjusting unit 1 and the control unit 201 execute temperature adjustment of the reagent based on the first temperature detected by the first temperature detection unit 4.

As a result, since the temperature of the reagent in the magnetic separating unit 12 and the stirrer 13 can be maintained in a constant temperature range, the reaction between the specimen and the reagent is performed under more appropriate conditions and the analytical accuracy of the detector 16 can be improved. That is, the temperature of the reagent in the pretreatment step of analysis can be controlled more accurately, and an automatic analysis device with high analytical accuracy can be realized.

Further, a second temperature detection unit 5 which is disposed within the liquid temperature adjusting unit 1 and detects the temperature of the reagent supplied to the processing unit 3 is further provided, and since the liquid temperature adjusting unit 1 and the control unit 201 obtain a target value of the second temperature detected by the second temperature detection unit 5 based on the first temperature and the temperature adjustment is executed based on a difference between the second temperature and the target value, the temperature of the reagent in the magnetic separating unit 12 and the stirrer 13 can be maintained in a constant temperature range with higher accuracy.

Further, the liquid temperature adjusting unit 1 and the control unit 201 execute temperature adjustment such that as the first temperature is higher, the second temperature is lower, and as the first temperature is lower, the second temperature is higher. Therefore, the temperature of the reagent in the magnetic separating unit and the stirrer 13 can be maintained in a constant temperature range.

Further, according to this example, since the temperature of the reagent immediately before the execution of the analysis can be maintained in an accurate constant range, the processing unit 3 is set as a portion to perform treatment with respect to the reaction solution at a position that greatly contributes to the improvement of analytical accuracy, thereby making it possible to further contribute to the improvement of analytical accuracy.

In the above-described example, the case where the first temperature detection unit 4 detects the air temperature in the vicinity of the processing unit 3 has been described, but instead, the temperature of the reagent supplied to the reaction vessel 11 may be detected, and both the air temperature in the vicinity of the processing unit 3 and the temperature of the reagent supplied to the reaction vessel 11 may be detected. When both temperatures are used, the control unit 201 may use the average value of both or may use both with weight on either one.

Example 2

An automatic analysis device according to Example 2 of the present invention will be described with reference to FIGS. 7 to 9. The same reference numerals are shown in the same configurations as in Example 1 and the descriptions thereof will be omitted. The same shall apply in the following examples. FIG. 7 is an enlarged view of a processing unit and a liquid temperature adjusting unit in the automatic analysis device according to Example 2. FIG. 8 is a diagram showing the structure of the processing unit of the automatic analysis device in Example 2, and FIG. 9 is a diagram showing the structure of the liquid temperature adjusting unit when viewed from a direction different from that of FIG. 8.

As shown in FIG. 7, in this example, in addition to the reaction vessel 11, a reagent container 9 for containing the reaction auxiliary liquid, which is a reagent supplied to the detection container 15, and a reagent container 10 for containing a cleaning solution are disposed in the container holding unit 22.

The reagent (reaction auxiliary liquid) in the reagent container 9 is supplied from the reagent storing unit 31 by operating a syringe pump 27 and solenoid valves 36 and 37. The reagent (cleaning solution) of the reagent container 10 is supplied from the reagent storing unit 32 by operating a syringe pump 28 and solenoid valves 38 and 39.

The container holding unit 22 can rotate and move up and down.

The reagents within the reagent containers 9 and 10 and the solution within the reaction vessel 11 are guided to the detection container 15 by operating a syringe pump 29 and solenoid valves 40 and 41, in a state where the container holding unit 22 is rotated and moved up and down such that the tip of the suction nozzle 21 enters the required container. In the detection container 15, the detector 16 detects the signal from the reaction solution, and then the reaction solution and the reagent are discharged to a waste liquid container 42.

The operation of the container holding unit 22 and the operations of the syringe pumps 27 and 28 and the solenoid valves 36, 37, 38, and 39 are executed according to a predetermined sequence.

Further, in this example, as shown in FIGS. 8 and 9, spiral pipes 111 and 112 having the same shape as the spiral pipe 110 are attached to a metal block 101A such as aluminum, in addition to the spiral pipe 110 obtained by spirally forming a pipe such as stainless steel. Connectors 113, 114, 115, 116, 117, are 118 are attached to the inlet and outlet of the spiral pipes 110, 111, and 112. The connectors 113, 114, 115, 116, 117, and 118 are threaded and connected to the tube 43 by a tube joint.

As a result, a control unit 201A controls the temperature adjustment by a liquid temperature adjusting unit 1A such that the temperature of the reagents supplied to the reagent containers 9 and 10 is also adjusted based on the first temperature.

The configuration and operation of a sensor input processing unit 202A, a target temperature computation unit 203A, and a Peltier element control unit 204A are the same as those of the sensor input processing unit 202, the target temperature computation unit 203, and the Peltier element control unit 204, respectively.

Other configurations and operations are substantially the same as those of the automatic analysis device of Example 1 described above and the details thereof will be omitted.

The automatic analysis device of Example 2 of the present invention also has almost the same effect as the automatic analysis device of Example 1 described above.

Further, the reagent containers 9 and 10 which temporarily hold the reagent supplied to the detection container 15 for analyzing the specimen, and the container holding unit 22 which holds the reaction vessel 11 and the reagent containers 9 and 10 are further provided and the liquid temperature adjusting unit 1A and the control unit 201A also adjust the temperature of the reagent supplied to the reagent containers 9 and 10 based on the first temperature. Therefore, the temperature of the reagent supplied to the detection container 15 via the reagent containers 9 and 10 located closer to the detector 16 can also be adjusted and the analytical accuracy in the detector 16 can be further improved.

Example 3

An automatic analysis device according to Example 3 of the present invention will be described with reference to FIGS. 10 to 14. FIG. 10 is an enlarged view of a processing unit and a liquid temperature adjusting unit in the automatic analysis device in Example 3. FIG. 11 is a diagram showing the structure of the liquid temperature adjusting unit of the automatic analysis device in Example 3, and FIG. 12 is a diagram showing the structure when viewed from a direction different from that of FIG. 11. FIG. 13 is a block diagram showing a control method of the liquid temperature adjusting unit of the automatic analysis device in Example 3. FIG. 14 is a diagram showing an example of the relationship between the air temperature of a third temperature detection unit and a target liquid temperature of a fourth temperature detection unit of the automatic analysis device in Example 3.

As shown in FIG. 10, in this example, in addition to the devices of Example 2, a third temperature detection unit 7 which detects the air temperature around the container holding unit 22 is further provided.

Further, a liquid temperature adjusting unit 1B which adjusts the temperature of the replacement solution and the reagent of this example is provided with a fourth temperature detection unit 8 which detects the temperature of the reagents supplied to the reagent containers 9 and 10 in addition to the second temperature detection unit 5 which measures the liquid temperature at the outlet of the reagent.

The signals from the first temperature detection unit 4, the second temperature detection unit 5, the third temperature detection unit 7, and the fourth temperature detection unit 8 are taken into a sensor input processing unit 202B of a control unit 201B.

As shown in FIGS. 11 and 12, in the liquid temperature adjusting unit 1B of this example, a metal block 101B is connected to a second Peltier element 6 via the thermal interface 105 in addition to the heat sink including the heat diffusion plate 103, the first Peltier element 2, the fin base 107, and the fins 108.

Further, the fourth temperature detection unit 8 composed of a thermistor or a thermocouple is provided in the vicinity of the outlets of the spiral pipes 111 and 112. The signal from the fourth temperature detection unit 8 is taken into the sensor input processing unit 202B of the control unit 201B.

Although the case where the first Peltier element 2 and the second Peltier element 6 are provided in the same metal block 101B has been described, the first Peltier element 2 and the second Peltier element 6 can be provided in separate metal blocks, and in this case, a heat insulating material or the like can be used therebetween.

As shown in FIG. 13, in the control unit 201B of this example, a target temperature computation unit 203B calculates a target temperature 205B of the second temperature detection unit 5 from the air temperature in the vicinity of the processing unit 3 detected by the second temperature detection unit 5. Further, the target temperature computation unit 203B calculates a target temperature 207B of the test solution to be detected by the fourth temperature detection unit from the air temperature in the vicinity of the container holding unit 22 detected by the third temperature detection unit 7.

After that, a first Peltier element control unit 204B controls the duty of the current output to the first Peltier element 2 based on the target temperature of the second temperature detection unit 5 calculated by the target temperature computation unit 203B and the actual temperature detected by the second temperature detection unit 5.

On the other hand, a second Peltier element control unit 206B controls the duty of the current output to the second Peltier element 6 based on the target temperature of the fourth temperature detection unit calculated by the target temperature computation unit 203B and the actual temperature detected by the fourth temperature detection unit 8.

Regarding the target liquid temperature of the second temperature detection unit 5 obtained by the target temperature computation unit 203B, as shown in FIG. 6, as the air temperature in the vicinity of the processing unit 3 detected by the first temperature detection unit 4 is higher, the target temperature of the second temperature detection unit 5, that is, the temperature of the reagent (replacement solution) is set to be lower.

Further, as shown in FIG. 14, in the target temperature computation unit 203B, as the air temperature in the vicinity of the container holding unit 22 detected by the third temperature detection unit 7 is higher, the target temperature of the fourth temperature detection unit 8, that is, the temperature of the reagent (the reaction auxiliary liquid and cleaning solution) is set to be lower.

Other configurations and operations are substantially the same as those of the automatic analysis device of Example 1 described above and the details thereof will be omitted.

The automatic analysis device of Example 3 of the present invention also has almost the same effect as the automatic analysis device of Example 1 described above.

Further, the third temperature detection unit 7 which detects at least one of the temperature of the air around the container holding unit 22 and the temperature of the reagents within the reagent containers 9 and 10 is further provided, and the liquid temperature adjusting unit 1B and the control unit 201B execute temperature adjustment of the reagents supplied to the reagent containers 9 and 10 based on the third temperature detected by the third temperature detection unit 7, and thus, the temperature of the reagent supplied to the detection container 15 via the reagent containers 9 and 10 can be adjusted and the analytical accuracy can be further improved as compared with Example 2.

Further, the liquid temperature adjusting unit 1B and the control unit 201B further include the fourth temperature detection unit 8 which detects the temperature of the reagents supplied to the reagent containers 9 and 10, and the liquid temperature adjusting unit 1B and the control unit 201B obtain a target value of the fourth temperature detected by the fourth temperature detection unit 8 based on the third temperature and execute temperature adjustment based on the difference between the fourth temperature and the target value. In particular, the liquid temperature adjusting unit 1B and the control unit 201B execute temperature adjustment such that as the third temperature is higher, the fourth temperature is lower, and as the third temperature is lower, the fourth temperature is higher. Thus, the temperature of the reagents supplied to the container 15 via the reagent containers 9 and 10 can be adjusted with higher accuracy.

In the above description, the first temperature detection unit 4 detects the air temperature in the vicinity of the processing unit 3, but instead or additionally, the temperature of the reagent within the reaction vessel 11 can be detected. Further, although the case where the third temperature detection unit 7 detects the air temperature in the vicinity of the container holding unit 22 has been described, instead or additionally, the liquid temperature within the reagent container 9 and/or the reagent container 10 can be detected.

Example 4

An automatic analysis device according to Example 4 of the present invention will be described with reference to FIGS. 15 to 17. FIG. 15 is an enlarged view of a processing unit and a liquid temperature adjusting unit in the automatic analysis device in Example 4. FIG. 16 is a block diagram showing a control method of the liquid temperature adjusting unit of the automatic analysis device in Example 4. FIG. 17 is a diagram showing an example of the relationship between the estimated values of the air temperature and the change in the calorific value of the first temperature detection unit and a target liquid temperature of the second temperature detection unit in the automatic analysis device in Example 4.

As shown in FIG. 15, in this example, detection units 70 and 71 of a motor and solenoid provided in the transport mechanism 51 and a detection unit 72 of a motor 14 for rotationally driving the stirrer 13 are provided to detect a current flowing through the motor or the like. The detection units 70, 71, and 72 may detect voltage or both current and voltage.

Further, as shown in FIGS. 15 and 16, a control unit 201C is provided with a second sensor input processing unit 209C, a calorific value estimation unit 210C, and a calorific value change computation unit 211C.

Then, as shown in FIG. 16, in the control unit 201C of the present example, the calorific value estimation unit 210C estimates the calorific value based on the current of the motor or the like detected by the detection units 70, 71, and 72, and the calorific value change computation unit 211C calculates a change in the calorific value.

Next, a target temperature computation unit 203C calculates a target temperature 205C of the second temperature detection unit 5 based on the air temperature in the vicinity of the processing unit 3 detected by the first temperature detection unit 4 and the change in the calorific value obtained by the calorific value change computation unit 211C.

A Peltier element control unit 204C controls the duty of the current output to the first Peltier element 2 based on the target temperature 205C of the second temperature detection unit 5 and the temperature actually detected by the second temperature detection unit 5.

FIG. 17 shows an example of the relationship between the temperature detected by the first temperature detection unit 4 and the target liquid temperature of the second temperature detection unit 5 with the change in the calorific value obtained by the calorific value change computation unit 211C as a parameter.

As shown in FIG. 17, it is set such that as the air temperature in the vicinity of the processing unit 3 detected by the first temperature detection unit 4 is higher, the target temperature of the second temperature detection unit 5, that is, the temperature of the reagent (replacement solution) is lower, and it is set such that as the increase in the calorific value is greater, the target liquid temperature of the second temperature detection unit 5 is lower, and as the decrease in the calorific value is greater, the target liquid temperature of the second temperature detection unit 5 is higher.

Other configurations and operations are substantially the same as those of the automatic analysis device of Example 1 described above and the details thereof will be omitted.

The automatic analysis device of Example 4 of the present invention also has almost the same effect as the automatic analysis device of Example 1 described above.

Further, an estimation unit which estimates the calorific value of the heating element existing within the automatic analysis device 100 is further provided, and the liquid temperature adjusting unit 1 and the control unit 201C obtain the target value of the second temperature detected by the second temperature detection unit 5 based on the change in the calorific value estimated by the estimation unit in addition to the first temperature and execute temperature adjustment based on the difference between the second temperature and the target value. In particular, the liquid temperature adjusting unit 1 and the control unit 201C execute temperature adjustment such that as the increase in the calorific value is greater, the second temperature is lower, and as the increase in the calorific value is smaller, the second temperature is higher. Therefore, since the cooling capacity of the first Peltier element 2 is adjusted in response to fluctuations in the calorific value, the temperature of the reagent in the magnetic separating unit 12 and the stirrer 13 can be maintained in a constant temperature range with higher accuracy. Therefore, the reaction between the specimen and the reagent can be performed under more appropriate conditions, and the analytical accuracy in the detector 16 can be further improved.

The estimation of the calorific value as in this example can be executed by the liquid temperature adjusting unit 1A of Example 2 and the liquid temperature adjusting unit 1B of Example 3.

Further, without being limited to the case where the target value of the second temperature detected by the second temperature detection unit 5 is obtained based on the change in the calorific value estimated by the estimation unit in addition to the first temperature and the temperature adjustment is executed based on the difference between the second temperature and the target value, the liquid temperature adjusting unit 1 and the control unit 201C can obtain the target value of the fourth temperature described in Example 3 based on the change in the calorific value estimated by the estimation unit in addition to the third temperature described in Example 3 and execute temperature adjustment based on the difference between the fourth temperature and the target value. In particular, the temperature adjustment can be executed such that as the increase in the calorific value is greater, the fourth temperature is lower, and as the increase in the calorific value is smaller, the fourth temperature becomes higher.

As a result, the temperature of the reagent supplied to the detection container 15 via the reagent containers 9 and 10 can be adjusted with higher accuracy and the analytical accuracy of the detector 16 can be further improved.

<Others>

The present invention is not limited to the above embodiments and includes various modifications. The above-mentioned embodiments have been described in detail in order to explain the present invention in an easy-to-understand manner and are not necessarily limited to those having all the described configurations.

It is also possible to replace a part of the configuration of one embodiment with the configuration of another embodiment and it is also possible to add the configuration of another embodiment to the configuration of one embodiment. Further, the addition of another configuration, deletion, and replacement can be made with respect to a part of the configuration of each embodiment.

REFERENCE SIGNS LIST

1, 1A, and 1B: Liquid temperature adjusting units (liquid temperature adjusting device)
2: First Peltier element
3: Processing unit
4: First temperature detection unit
5: Second temperature detection unit
6: Second Peltier element
7: Third temperature detection unit
8: Fourth temperature detection unit
9 and 10: Reagent container
11: Reaction vessel
12: Magnetic separating unit
13: Stirrer
14: Motor (Heating element)
15: Detection container
16: Detector
21: Suction nozzle
22: Container holding unit
26, 27, 28, and 29: Syringe pumps (Supply equipment)
30, 31, and 32: Reagent storing units (Supply equipment)
34, 35, 36, 37, 38, 39, 40, and 41: Solenoid valves (Supply equipment)
42: Waste liquid container
43: Tube
51: Transport mechanism (Heating element)
52: Suction nozzle (Supply equipment)
53: Discharge nozzle (Supply equipment)
60: Reaction table
70, 71, and 72: Detection units
100: Automatic analysis device
101, 101A, and 101B: Metal blocks
102: Heat insulating material
103: Heat diffusion plate
104, 105, and 106: Thermal interfaces (grease)
107: Fin base
108: Fin
109: Fan
110, 111, and 112: Spiral pipes
113, 114, 115, 116, 117, and 118: Connectors
201, 201A, 201B, and 201C: Control units (liquid temperature adjusting devices)
202, 202A, and 202B: Sensor input processing units
203, 203A, 203B, and 203C: Target temperature computation units
204, 204A, and 204C: Peltier element control units
204B: First Peltier element control unit
205, 205B, 205C, and 207B: Target temperature
206B: Second Peltier element control unit 209C: Second sensor input processing unit (Estimation unit)
210C: Calorific value estimation unit (Estimation unit)
211C: Calorific value change computation unit (Estimation unit)
301: Rack
302: Specimen container
303: Specimen dispensing nozzle
306: Reaction vessel transport mechanism
307: Specimen dispensing tip and reaction vessel holding member
311: Reagent disk
314: Reagent dispensing nozzle
317: Rack conveyance line
319: Control device

The invention claimed is:

1. An automatic analysis device which reacts a specimen with a reagent and measures a reacted reaction solution, the device comprising:
a processing unit configured to perform a treatment on a specimen before an analysis of the specimen;
supply equipment configured to supply the reagent to a reaction vessel disposed in the processing unit;
a liquid temperature adjusting device configured to adjust the temperature of the reagent supplied to the reaction vessel by the supply equipment;
a first temperature detection unit configured to detect a temperature of the air within the processing unit; and
a second temperature detection unit which is disposed within the liquid temperature adjusting device and is configured to detect a temperature of the reagent supplied to the processing unit as a second temperature;
wherein the liquid temperature adjusting device is configured to execute temperature adjustment of the reagent based on a first temperature detected by the first temperature detection unit; and
wherein the liquid temperature adjusting device is configured to determine a target value of the second temperature based on a relationship between the first temperature and the second temperature and execute temperature adjustment based on a difference between the second temperature and the target value such that the second temperature is adjusted toward the target value.

2. The automatic analysis device according to claim 1, wherein
the liquid temperature adjusting device is configured to execute temperature adjustment based on the relationship between the first temperature and the second temperature in which the second temperature decreases as the first temperature increases.

3. The automatic analysis device according to claim 1, further comprising:
a reagent container configured to temporarily hold the reagent supplied to a detection container where analysis of the specimen is performed; and
a container holding unit configured to hold the reaction vessel and the reagent container, wherein
the liquid temperature adjusting device is configured to adjust the temperature of the reagent supplied to the reagent container based on the first temperature.

4. The automatic analysis device according to claim 3, further comprising:
a third temperature detection unit configured to detect at least one temperature of a temperature of the air around the container holding unit and a temperature of the reagent within the reagent container, wherein
the liquid temperature adjusting device is configured to execute temperature adjustment of the reagent supplied to the reagent container based on a third temperature detected by the third temperature detection unit.

5. The automatic analysis device according to claim 4, further comprising:
a fourth temperature detection unit configured to detect a temperature of the reagent supplied to the reagent container as a fourth temperature, wherein
the liquid temperature adjusting device is configured to determine a target value of the fourth temperature based on a relationship between the third temperature and the fourth temperature and execute temperature adjustment based on a difference between the fourth temperature and the target value such that the fourth temperature is adjusted toward the target value.

6. The automatic analysis device according to claim 5, wherein
the liquid temperature adjusting device is configured to execute temperature adjustment based on the relationship between the third temperature and the fourth temperature in which the fourth temperature decreases as the third temperature increases.

7. The automatic analysis device according to claim 1, further comprising:
an estimation unit configured to estimate a calorific value of a heating element present within the automatic analysis device, wherein
the liquid temperature adjusting device is configured to acquire a target value of the second temperature based on a change in the calorific value estimated by the estimation unit in addition to the first temperature and executes temperature adjustment based on a difference between the second temperature and the target value such that the second temperature is adjusted toward the target value.

8. The automatic analysis device according to claim 7, wherein
the liquid temperature adjusting device is configured to execute temperature adjustment based on a relationship between the calorific value and the second temperature in which the second temperature decreases as the calorific value increases.

9. The automatic analysis device according to claim 5, further comprising:
an estimation unit configured to estimate a calorific value of a heating element present within the automatic analysis device, wherein
the liquid temperature adjusting device is configured to determine a target value of the fourth temperature based on a change in the calorific value estimated by the estimation unit in addition to the third temperature and execute temperature adjustment based on a difference between the fourth temperature and the target value such that the fourth temperature is adjusted toward the target value.

10. The automatic analysis device according to claim 9, wherein
the liquid temperature adjusting device is configured to execute temperature adjustment based on a relationship between the calorific value and the fourth temperature in which the fourth temperature decreases as the calorific value increases.

11. The automatic analysis device according to claim 1, wherein the processing unit is a part which performs the treatment on the reaction solution.

\* \* \* \* \*